United States Patent [19]

DeRudder et al.

[11] Patent Number: 4,938,056
[45] Date of Patent: Jul. 3, 1990

[54] DETERMINING THE AIR PERMEABILITY OF A TIRE

[75] Inventors: James L. DeRudder, Mt. Vernon, Ind.; Kenneth M. Schur, Middleburg, Hts.; John P. Porter, Cuyahoga Falls, both of Ohio

[73] Assignee: The Uniroyal Goodrich Tire Company, Akron, Ohio

[21] Appl. No.: 358,757

[22] Filed: May 30, 1989

[51] Int. Cl.⁵ .................... B60C 23/04; G01M 17/02
[52] U.S. Cl. ........................................ 73/49; 73/146; 73/146.2
[58] Field of Search ................ 73/146.2, 146.3, 49.2, 73/146.8, 146, 38, 49; 374/143

[56] References Cited

U.S. PATENT DOCUMENTS

4,703,650 11/1987 Dosjoub et al. .................. 374/143
4,723,445  2/1988 Ripley et al. ..................... 73/146.3

Primary Examiner—Donald O. Woodiel
Attorney, Agent, or Firm—Alan A. Csontos; Greg Strugalski

[57] ABSTRACT

Determining the rate of change of fluid pressure in a tire comprises mounting the tire in an inflated condition. A tire pressure sensor senses fluid pressure in the tire and generates an electrical signal in proportion to the fluid pressure sensed in the tire. A temperature sensor senses the temperature adjacent the tire and generates an electrical signal in proportion to the temperature sensed adjacent the tire. A data acquisition system is in electrical communication with the sensors. The data acquisition system receives the electrical signals from the respective sensors at a substantially simulatneously time and converts the electrical signals into digital information. An electronic digital computer is an electrical communication with the data acquisition system for receiving the digital information and for calculating a value representative of a corrected pressure in the tire as a function of the digital information received. A plurality of the corrected pressure values are stored. The stored corrected pressure values are linearized to provide another value indicative of the rate of change of pressure in the tire.

27 Claims, 4 Drawing Sheets

DETERMINING THE AIR PERMEABILITY OF A TIRE

BACKGROUND OF THE INVENTION

1. Field of the Invention

The present invention relates to determining the rate of change of fluid pressure in a sealed article. In particular, the present invention relates to determining the rate of air pressure loss from an inflated pneumatic tire over a period of time which is indicative of the air permeability of the material comprising the tire.

2. Description of the Prior Art

A pneumatic tire typically includes at least one layer of elastomeric sheet material. The tire is formed in a generally torroidal configuration with the inner periphery of the tire open. The tire is mounted on a wheel rim to seal off the open inner periphery. A valve extends from the wheel rim for conducting pressurized air into the tire.

It is known that the elastomeric sheet material used in the construction of the tire is not absolutely air impermeable. Air is gradually lost from within the tire by the air permeating through the elastomeric sheet material over a relatively long period of time. As the air permeates through the tire, the air pressure within the tire decreases. This loss of air pressure may render the tire less efficient for its intended use on a vehicle. Thus, it is important to determine the rate at which air pressure is lost from within the tire.

This rate of air pressure loss from within the tire over time is representative of the air permeability rate of the tire. The air permeability rate of the tire is of particular importance since end users of the tire, such as automobile manufacturers, often have maximum air permeability rate requirements. For example, a maximum allowable air permeability rate is typically referred to as a threshhold percentage decrease in air pressure within the tire per month.

Known ways of determining the air premeability rate of a tire exist. The known ways include monitoring the air pressure within a tire and wheel assembly over an extended period of time, such as three to six months. This amount of time is necessary to acquire a relatively large number of different air pressure readings that are needed to perform a statistically significant analysis of the tire. The air permeability rate of the tire is calculated over that time period and is compared to the threshhold air permeability rate requirement to determine acceptability.

This known way typically includes merely the visual reading of a bourdon tube air pressure gauge attached to the valve extending from the wheel rim and manually recording the air pressure. A calculation is performed on a sufficient number of the recorded air pressure readings. This known way often has drawbacks, such as in an inconsistency in reading the air pressure gauge and the lack of accuracy of the air pressure gauge.

The known way also has the disadvantage of not compensating for an increase in volume or "growth" during testing of an unaged tire. An unaged tire is a tire which has not been inflated prior to testing. The resultant increase in volume of the unaged tire proportionately decreases the air pressure within the unaged tire without a loss of air from within the unaged tire.

The known way also suffers from the disadvantage of not being able to compensate for changes in environmental conditions adjacent the tire over such an extended period of time. For example, it is known that over a three to six month time interval that the temperature immediately adjacent the tire being tested may vary. If a decrease in temperature is not compensated for, the test may yield unacceptable results for a tire that is in fact acceptable. That is, pressure in the tire may decrease without a loss of air. Thus, the rate of air pressure loss from within a tire is difficult to accurately determine.

SUMMARY OF THE INVENTION

The present invention is directed to accurately determining the rate of change of fluid pressure in a closed container, such as a tire. The present invention includes means for mounting the tire in an inflated condition. Extremely accurate tire pressure sensing means is in fluid communication with the inflated tire and senses the absolute fluid pressure in the tire. The tire pressure sensing means generates an electrical signal in proportion to the absolute fluid pressure sensed in the tire. Temperature sensing means is located adjacent the tire and senses the temperature adjacent the tire. The temperature sensing means generates an electrical signal in proportion to the temperature sensed adjacent the tire. Data acquisition means is in electrical communication with the tire pressure sensing means and the temperature sensing means. The data acquisition means receives the electrical signals from the respective sensing means at a substantially simultaneous time and converts the electrical signals into digital information. Computer means is in electrical communication with the data acquisition means and receives the digital information. The computer means calculates a value representative of a corrected pressure in the tire as a function of the digital information.

The change in air pressure in the tire since the beginning of the test is corrected for a change in temperature according to the formula:

$$P = (P_1)(T/T_1) - B.$$

P is the computed corrected gauge pressure in kPa. $P_1$ is the absolute pressure measured by the tire pressure sensing means. T is a reference temperature in degrees Kelvin taken at the beginning of the test. $T_1$ is the temperature in degrees Kelvin measured by the temperature sensing means. B is a reference atmospheric pressure in kPa.

The computer means further includes storage means for storing a plurality of the values representative of corrected pressure in the tire. The computer means also includes a first computer program to compensate the plurality of values stored in the storage means for growth over time of an unaged tire. The computer means also includes a second computer program to linearize the plurality of values stored in the storage means to provide a value representative of the rate of change of pressure in the tire over time.

Preferably, the tire is placed in an insulated enclosure to protect the tire and the sensing means from external disturbances. The enclosure is connected with a heat source and a cooling source to maintain the temperature within the enclosure between a predetermined minimum temperature and a predetermined maximum temperature. Air is circulated within the enclosure and over the tire to minimize temperature variation of the air surrounding the tire.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENTS

Figure 1:
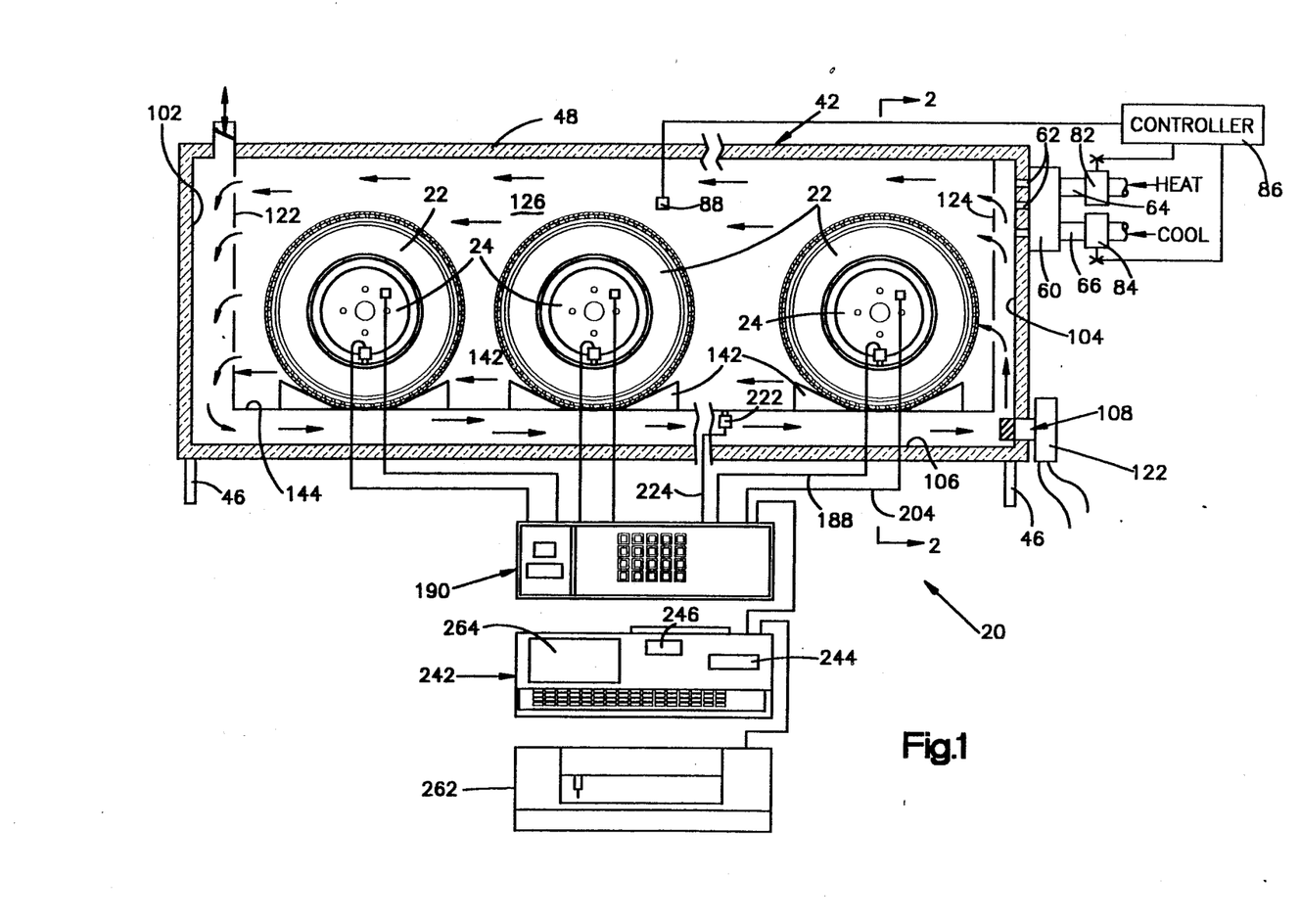
FIG. 1 is a schematic view of a permeability test system embodying the present invention.

A permeability test system 20 is illustrated in FIG. 1 for testing the rate of air pressure loss in a tire 22. The tire 22 is formed in a generally torroidal configuration having an open inner periphery. The tire 22 is mounted in an inflated condition on a wheel rim 24 to seal the open inner periphery and form a closed container. The wheel rim 24 is preferably metal and is found to provide an airtight seal when the tire 22 is inflated. Any seams in the wheel rim 24 are preferably ground flat and brazed closed to prevent any fluid leakage during testing.

Figure 2:
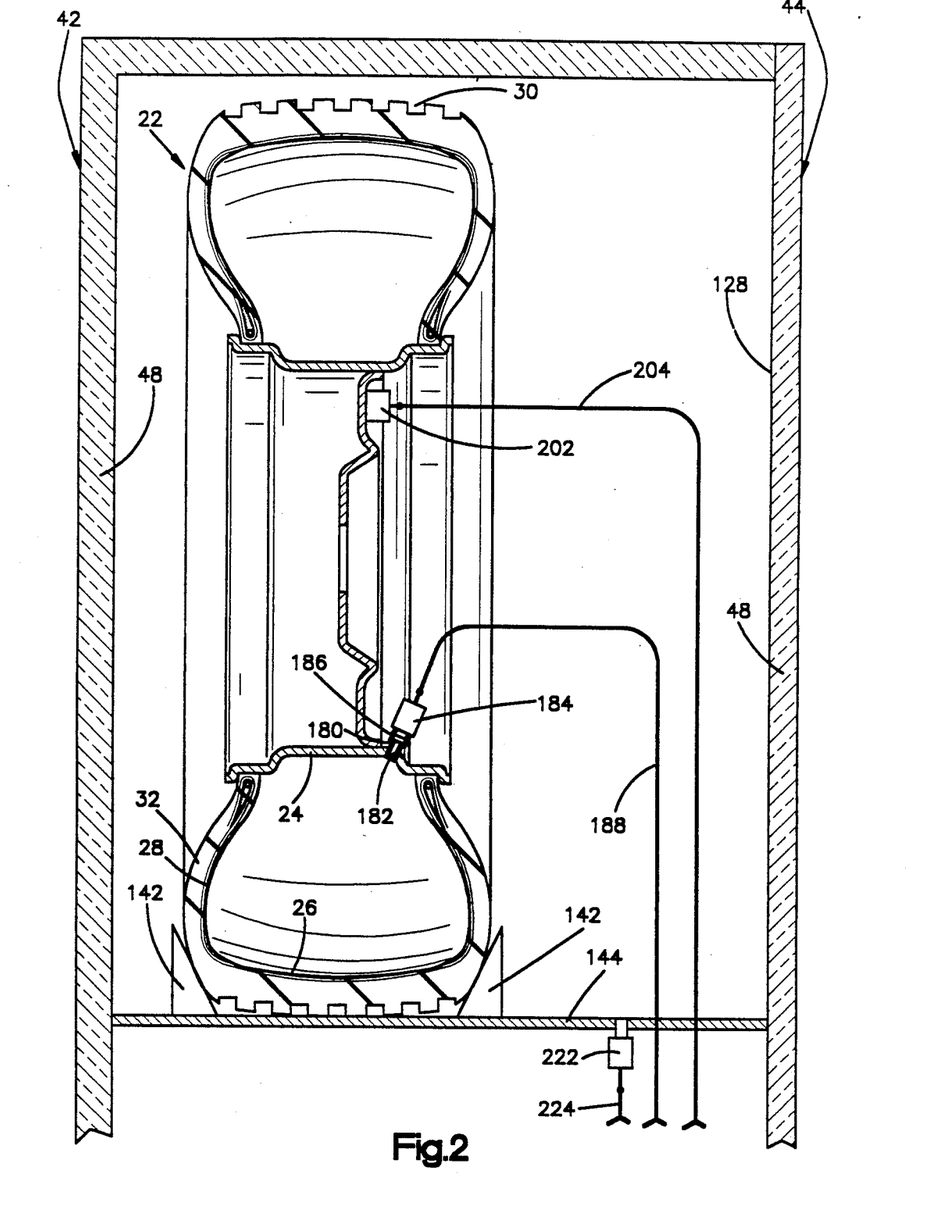
FIG. 2 is an enlarged cross-sectional view, taken approximately along the line 2—2 in FIG. 1, of a tire in the permeability test system.

The tire 22 includes an inner liner 26 (FIG. 2), a carcass 28, a tread 30 and a pair of sidewalls 32 all of which are at least partially made from elastomeric material. The elastomeric material may be of any suitable natural or synthetic rubber. The elastomeric material is not absolutely air impermeable and has physical properties that permit the permeation of a fluid, such as air, through the elastomeric material over a relatively long period of time.

The permeability test system 20 includes an enclosure 42 (FIG. 1) for receiving and storing the mounted tire 22 to be tested. The tire 22 is stored within the enclosure 42 to assure that the tire is not disturbed or moved during the test. Thus, the chance of erroneous readings of the air pressure in the tire 22, due to disturbances, is minimized. The permeability test system 20 is illustrated in FIG. 1 as simultaneously testing three tires 22. It will be apparent that the permeability test system 20 can be modified to accommodate testing any number of tires 22 that may be desired.

A door 44 (FIG. 2) is hinged to the enclosure 42. The door 44 permits access to the interior of the enclosure 42 and shuts off the interior of the enclosure from the surrounding environment. The enclosure 42 is supported on legs 46. The enclosure 42 and door 44 include thermal insulation 48 to maintain the temperature within the enclosure as nearly constant as possible throughout the duration of the test. It is important to maintain the temperature relatively constant within the enclosure 42 to minimize the change in pressure in the tire 22 due to variations in ambient temperature of the environment surrounding the tire.

To maintain the temperature relatively constant within the enclosure 42, a manifold 60 communicates with openings 62 extending through the enclosure. Ducts 64, 66 are connected with the manifold 60. The duct 64 is connected with a heat source. A valve 82 is located in the duct 64 to control the flow of heated air between the heat source and the manifold 60. The duct 66 is connected with a cooling source. A valve 84 is located in the duct 66 to control the flow of cooling air between the cooling source and the manifold 60.

The valves 82, 84 are controlled by a controller 86 which is in electrical communication with a thermocouple 88 located in the enclosure 42. The controller 86 regulates the valves 82, 84 as a function of the temperature sensed by the thermocouple 88 to maintain the temperature within the enclosure 42 between a predetermined maximum temperature and a predetermined minimum temperature. The predetermined maximum and minimum temperatures may be programmed into the controller 86. For example, it is preferred to maintain the temperature within the enclosure 42 between 20.7° C. and 21.3° C.

A pair of plenum chambers 102, 104 are located at opposite ends of the enclosure 42. A duct 106 connects the plenum chambers 102, 104. A fan 108 is located adjacent the intersection of the duct 106 and the plenum chamber 104. The fan 108 draws air from the plenum chamber 102, through the duct 106 and forces the air through the plenum chamber 104. This assures a relatively low velocity flow of air over the tire 22 and a relatively uniform temperature throughout the entire enclosure 42. The fan 108 is driven by an electric motor 122 which is preferably energized for the entire duration of the test. The manifold 60 is connected with the plenum chamber 104 to assure quick assimilation of heated or cooled air into the enclosure 42 as the air circulates through the plenum chamber 104.

Preferably, each tire 22 is supported vertically within the enclosure 42 so the tire does not contact any of the sidewalls 122, 124, 126, 128 (FIGS. 1 and 2) of the interior of the enclosure. This assures that the circulating air, of a uniform temperature, flows over a relatively large surface area of the tire 22 to maintain the temperature of the air within the tire relatively constant. A plurality of wedges 142 (FIGS. 1 and 2) support the tire 22 vertically on the floor 144 of the enclosure 42. The wedges 142 prevent the tire 22 from rolling within the enclosure 42 during the test.

A metal valve stem 182 (FIG. 2) extends from an opening 180 in the wheel rim 24 and is in fluid communication with the interior of the tire 22. The valve stem 182 is brazed to the wheel rim 24 to assure that there is no air leakage between the valve stem and wheel rim. A tire pressure transducer 184 is connected to the valve stem 182 through a double o-ring type of quick disconnect coupler 186.

The tire pressure transducer 184 is a non-vented type which senses the absolute fluid pressure in the tire 22. The tire pressure transducer 184 generates an analog electrical signal in proportion to the absolute fluid pressure sensed within the inflated tire 22. The tire pressure transducer 184 has an accuracy of 0.05 percent and is available under the brand name Super TJE from Sensotec in Columbus, Ohio. The tire pressure transducer 184 is electrically connected with a data acquisition system 190 (FIG. 1) through an electrical cable 188. The data acquisition system 190 includes a suitable power supply.

A thermocouple 202 is fixed to the wheel rim 24. The thermocouple 202 (FIG. 2) senses the temperature adjacent the tire 22. The thermocouple 202 generates an analog electrical signal in proportion to the temperature sensed adjacent the tire 22. The thermocouple 202 is in electrical communication with the data acquisition system 190 (FIG. 1) through a cable 204. Since the air within the enclosure 42 circulates over the tire 22, it is assumed that the temperature of the air within the tire is the same as that sensed by the thermocouple 202 attached to the wheel rim 24.

An ambient pressure transducer 222 is located in the enclosure 42. The ambient pressure transducer 222 is preferably identical to the tire pressure transducer 184 and is threaded into the floor 144 of the enclosure 42. The ambient pressure transducer 222 senses ambient pressure within the enclosure 42. The ambient pressure transducer 222 generates an analog electrical signal in proportion to the ambient pressure sensed within the enclosure 42. The ambient pressure transducer 222 is in electrical communication with the data acquisition system 190 by a cable 224.

The data acquisition system 190 receives the analog electrical signals generated by the pressure transducers 184, 222 and the thermocouple 202 of the permeability test system 20 at a substantially simultaneous time. The data acquisition system 190 is programmable to acquire the analog electrical signals at predetermined time intervals and for a predetermined time duration. Analog electrical signals are preferably acquired at one hour time intervals for at least a two week duration. The data acquisition system 190 converts the analog electrical signals received from the pressure transducers 184, 222 and the thermocouple 202 into digital information. The digital information is stored temporarily in the data acquisition system 190. Thus, a relatively large amount of accurate digital information is collected over a relatively short period of time. The data acquisition system 190 is available from Hewlett Packard in Palo Alto, Calif. under part number 3497A.

An electronic digital computer 242 is in electrical communication with the data acquisition system 190. The computer 242 receives the digital information from the data acquisition system 190 after all the analog signals have been acquired and converted to digital information. The computer 242 preferably stores the acquired digital information in a memory device such as a floppy disk 244 or tape 246. Each set of digital information acquired is referenced in the computer 242 to an hour of the test that the digital information was acquired.

The computer 242 is programmed to calculate a corrected value representative of the air pressure in the tire 22 as a function of the digital information at a particular hour of the test. The value is corrected for any change in the temperature of the air within the tire 22 which occurred during the test. Without compensating for a change in temperature, the tire 22 may appear to have lost air when, in fact, the tire may not have lost air. The change in air pressure in the tire 22 since the start of the test, which is corrected as a function of temperature, is represented by the formula:

$$P = (P_1)(T/T_1) - B$$

P is the computed corrected gauge pressure in kPa. $P_1$ is the absolute pressure measured by the tire pressure transducer 184. T is a reference temperature in degrees Kelvin taken at the beginning of the test. $T_1$ is the temperature in degrees Kelvin measured by the thermocouple 202. B is a reference atmospheric pressure in kPa. Thus, temperature change is compensated for according to the Perfect Gas Law to provide a value representative of a corrected pressure in the tire at the time the analog signals were acquired. The corrected pressure values are stored in the memory device 244 or 246 for later retrieval.

The atmospheric pressure may also be compensated for by calculating B to reflect the change in atmospheric pressure when the tire pressure transducer 184 is a vented type of transducer that measures gauge pressure within the tire 22. B in the above formula for corrected pressure would be substituted by B. $B_1$ is the atmospheric pressure in the enclosure 42 measured by the pressure transducer 222. Thus, the value representative of the pressure in the tire 22 is the corrected gauge pressure of the air in the tire which was corrected for changes in ambient temperature and pressure since the start of the test.

Figure 3:
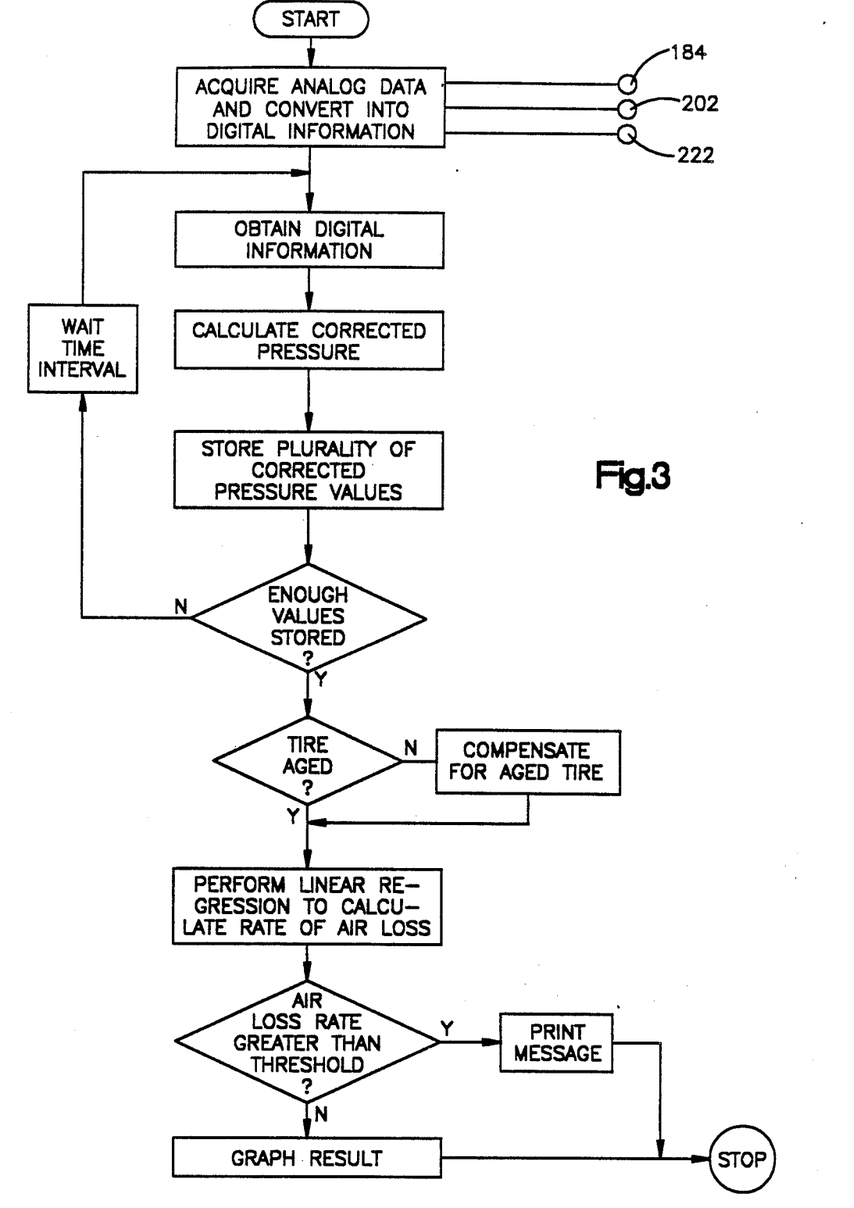
FIG. 3 is a diagram of steps for determining the rate of fluid pressure change in the tire in the permeability test system of FIG. 1.

The computer 242 is programmed, as illustrated in FIG. 3, to retrieve the corrected pressure values stored on disk 244 or tape 246 and perform a least squares linear regression analysis on the corrected pressure values at predetermined time intervals. The linear regression analysis is performed on the corrected pressure values as a function of time according to the equation:

$$\ln P = \ln P_o + bt$$

P is the corrected pressure value in kPa. $P_o$ is the theoretical intercept of the axis along which the natural log of pressure is plotted in kPa. b is the loss rate per day of the corrected pressure values at the nominal test temperature corresponding to the slope of the line being fitted to the connected pressure values as a function of time. t is the test time in days.

The linear regression analysis will provide a value representative of the rate of change of fluid pressure within the tire 22 over time by solving for b and $P_o$. This is indicative of the permeability of the elastomeric material comprising the tire 22 and can be compared with a threshhold requirement value. The calculated air loss rate constant b will be in units of %/day. This resultant number typically is a very small decimal. Thus, it is convenient, and perhaps more intuitively meaningful, to express loss rate as a percent per month. This is done by multiplying b by 3000 (which is 100% x 30 days/month).

The linear regression analysis may be performed periodically before the end of the test, for example, on a daily basis. If the rate of change in pressure is relatively large, the test can be terminated. Terminating the test prior to test completion avoids wasting permeability test system 20 time if, for example, a leak somewhere in the system occurs.

Figure 4:
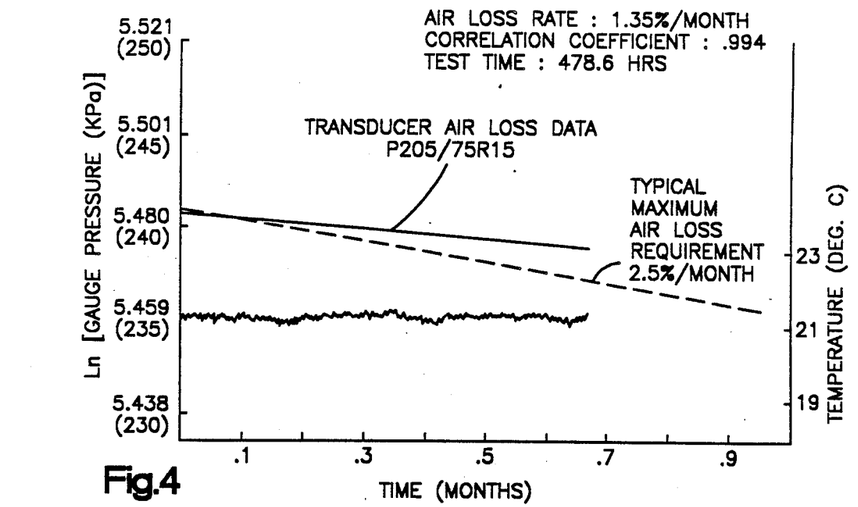
FIG. 4 is a graph representing the rate of fluid pressure change within the tire determined by the permeability test system.

A graphics plotter 262 or other suitable output device such as a graphics display screen 264 is connected with the computer 242 to graphically display the results of the linear regression analysis. Such graphical output is illustrated in FIG. 4 and is plotted against a desired maximum air loss requirement line. Also, as illustrated in FIG. 4, the temperatures which were monitored during the test may be plotted on the right axis.

Figure 5:
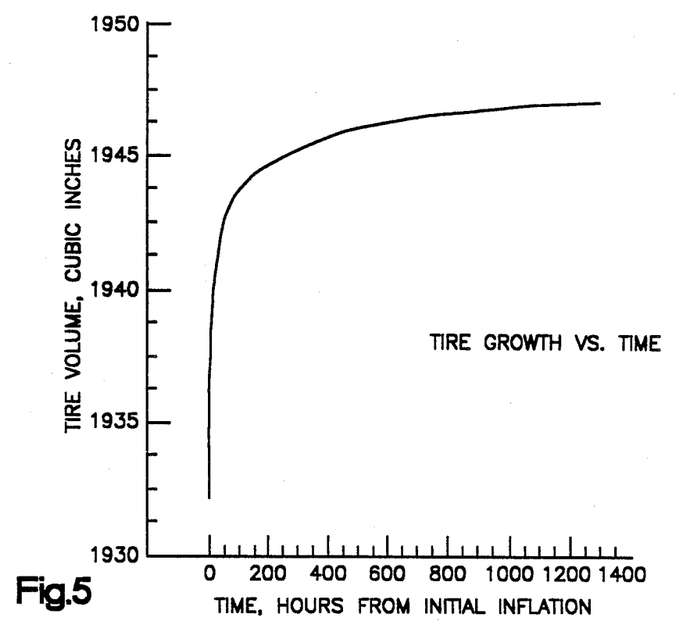
FIG. 5 is a graph representing an increase in volume in an unaged tire as a function of time.

Preferably, each tire 22 to be tested is "aged" for at least one month prior to testing the air permeability of the tire. "Aging" a tire 22 merely consists of mounting the tire on a wheel rim 24 and inflating the tire to a predetermined pressure, such as the rated operating pressure as indicated on the side of the tire. This allows the tire to "grow" or increase in volume as a function of time during its first days of inflation, as illustrated in FIG. 5. An unaged tire typically increases in volume at a relatively rapid rate for the approximately first 60 hours the tire is inflated. Approximately 60 hours after initial inflation, the tire 22 does not grow at such a rapid rate. Any growth in the tire 22 after 60 hours after initial inflation takes place at a relatively lower rate. Eventually, the rate of growth of the tire 22 approaches zero.

If it is desired that an unaged tire 22 be tested, the permeability test system 20 will accommodate such a test. Since it is possible to perform the entire test within approximately two to three weeks and obtain accurate results, an unaged tire 22 may be tested and compensated for by an optional computer program. The optional computer program is preferably run before the linear regression analysis is performed. The optional computer program compensates the pressure within the tire 22 for a change in volume that the unaged tire undergoes according to the Perfect Gas Law as a function of the graphical model illustrated in FIG. 5.

Thus, the present invention provides a test for determining the permeability of elastomeric material in a tire 22. The test provides accurate results in a relatively short time. This is possible because a relative large amount of accurate data is acquired over a relatively short period of time. The data is corrected for to reflect only a change in pressure due to the permeation of air through the tire and not due to aging, temperature or atmospheric pressure changes.

From the above description of preferred embodiments of the invention, those skilled in the art will perceive improvements, changes and modifications. Such improvements, changes and modifications within the skill of the art are intended to be covered by the appended claims.

Having described a preferred embodiment of the invention, we claim:

1. An apparatus for determining the fluid pressure in a tire, said apparatus comprising:
    means for mounting the tire in an inflated condition;
    tire pressure sensing means in fluid communication with the interior of the inflated tire for sensing the fluid pressure in the tire and for generating an electrical signal in proportion to the fluid pressure sensed in the tire;
    temperature sensing means adapted for attachment to said mounting means for sensing the temperature adjacent the tire and for generating an electrical signal in proportion to the temperature sensed adjacent the tire;
    data acquisition means in electrical communication with said tire pressure sensing means and said temperature sensing means for receiving the electrical signals generated by said respective sensing means at a substantially simultaneous time and for converting the electrical signals to digital information; and
    computer means in electrical communication with said data acquisition means for receiving the digital information and for calculating a value representative of a corrected pressure in the tire as a function of the digital information.

2. The apparatus set forth in claim 1 wherein said computer means computes the value representative of the fluid pressure (P) in the tire after a predetermined period of time according to the formula:

$$P = (P_1)(T/T_1) - B$$

where $P_1$ is the absolute pressure measured by said tire pressure sensing means, T is a reference temperature measured by said temperature sensing means at the beginning of the predetermined time, $T_1$ is the temperature measured by said temperature sensing means at the end of the predetermined time and B is a standard reference atmospheric pressure.

3. The apparatus set forth in claim 1 further including pressure sensing means for sensing atmospheric pressure adjacent the exterior of the tire and for generating an electrical signal in proportion to the pressure sensed adjacent the exterior of the tire.

4. The apparatus set forth in claim 1 wherein said computer means further includes storage means for storing a plurality of values representative of corrected pressure in the tire, said computer means further including first program means to linearize the plurality of values to provide another value representative of the rate of change of pressure in the tire.

5. The apparatus set forth in claim 4 wherein said first program means calculates said rate of change of fluid pressure in the tire as a function of time according to the equation:

$$\ln P = \ln P_o + bt$$

where P is a corrected pressure value, $P_o$ is an intercept of the axis along which the natural log of corrected pressure values are plotted, b is said rate of change of the fluid pressure and t is the test time.

6. The apparatus set forth in claim 4 wherein said computer means further includes second program means for compensating the plurality of values as a function of growth over time of an unaged tire.

7. The apparatus set forth in claim 1 further including an insulated enclosure for receiving the tire and means for maintaining the temperature within said enclosure between a predetermined minimum temperature and a predetermined maximum temperature.

8. The apparatus set forth in claim 7 further including means for circulating air within said enclosure.

9. A method for determining the air permeability of a tire, said method comprising the steps of:
    mounting the tire in an inflated condition;
    placing the tire in a temperature controlled enclosure;
    sensing the pressure in the tire and generating an electrical signal as a function of the pressure sensed in the tire;
    sensing the temperature adjacent the tire and generating an electrical signal as a function of the temperature sensed adjacent the tire;
    receiving the electrical signals generated in each of said sensing steps and converting the signals to digital information;
    computing a value representative of a corrected pressure in the tire as a function of the digital information;
    storing a plurality of the values; and
    calculating a linearized value as a function of the plurality of values representative of the rate of change of corrected pressure in the tire which is indicative of the premeability of the tire.

10. The method set forth in claim 9 wherein said calculating step includes calculating the rate of change of corrected pressure in the tire as a function of time according to the equation:

$$\ln P = \ln P_o + bt$$

where P is a corrected pressure value, $P_o$ is an intercept of the axis along which the natural log of corrected pressure values are plotted, b is said rate of change of the fluid pressure and t is the test time.

11. The method set forth in claim 9 further including the step of performing a calculation on the plurality values to compensate for growth in unaged tires, said step of performing a calculation on the plurality of values being completed before said calculating step.

12. The method set forth in claim 9 wherein said computing step includes calculating the value representative of the air pressure (P) in the tire after a predetermined period of time according to the formula:

$$P = (P_1)(T/T_1) - B$$

where $P_1$ is the absolute pressure measured by said fluid pressure sensing step, T is the temperature measured by said temperature sensing step at the beginning of the predetermined time, $T_1$ is the temperature measured by said temperature sensing step at the end of the predetermined time and B is a standard reference atmospheric pressure.

13. An apparatus for determining the air permeability of a tire, said apparatus comprising:
   means for mounting the tire in an inflated condition;
   tire pressure sensing means in fluid communication with the interior of the inflated tire for sensing the fluid pressure in the tire and for generating an electrical signal in proportion to the fluid pressure sensed in the tire;
   temperature sensing means adapted for attachment to said mounting means for sensing the temperature adjacent the tire and for generating an electrical signal in proportion to the temperature sensed adjacent the tire;
   data acquisition means in electrical communication with said tire pressure sensing means and said temperature sensing means for receiving the electrical signals generated by said respective sensing means at a substantially simultaneous time and for converting the electrical signals to digital information;
   computer means in electrical communication with said data acquisition means for receiving the digital information and for calculating a value representative of a corrected pressure in the tire as a function of the digital information;
   storage means for storing a plurality of values representative of corrected pressure in the tire; and first program means to linearize the plurality of values to provide another value representative of the rate of change of pressure in the tire.

14. The apparatus set forth in claim 13 wherein said means to linearize calculates said rate of change of fluid pressure in the tire as a function of time according to the equation:

$$\ln P = \ln P_o + bt$$

where P is a corrected pressure value, $P_o$ is an intercept of the axis along which the natural log of corrected pressure values are plotted, b is said rate of change of the fluid pressure and t is the test time.

15. The apparatus set forth in claim 13 wherein said computer means computes the value representative of the fluid pressure (P) in the tire after a predetermined period of time according to the formula:

$$P = (P_1)(T/T_1) - B$$

where $P_1$ is the absolute pressure measured by said tire pressure sensing means, T is the temperature measured by said temperature sensing means at the beginning of the predetermined time, $T_1$ is the temperature measured by said temperature sensing means at the end of the predetermined time and B is a standard reference atmospheric pressure.

16. The apparatus set forth in claim 15 wherein said computer means further includes second program means for compensating the plurality of values as a function of growth over time of an unaged tire.

17. An apparatus for determining fluid pressure in an inflated article, said apparatus comprising:
   first sensing means in fluid communication with the interior of the article for sensing fluid pressure in the article and for generating a signal in proportion to the absolute fluid pressure within the article, said first sensing means comprising a nonvented pressure transducer;
   second sensing means for sensing at least one condition adjacent the exterior of the article and for generating a signal in proportion to the condition sensed, said second sensing means comprising a thermocouple;
   means for acquiring the signals from said first and second sensing means; and
   means for calculating a value representative of a corrected fluid pressure in the article as a function of the signals acquired from said first and second sensing means.

18. The apparatus set forth in claim 17 wherein said second sensing means further includes pressure sensing means for sensing atmospheric pressure adjacent the exterior of the article and for generating an electrical signal in proportion to the pressure sensed adjacent the exterior of the article.

19. The apparatus set forth in claim 18 wherein said calculating means calculates the value representative of the fluid pressure (P) in the article after a predetermined period of time according to the formula:

$$P = (P_1)(T/T_1) - B$$

where $P_1$ is the absolute pressure measured by said first sensing means, T is a reference temperature measured by said thermocouple at the beginning of the predetermined time, $T_1$ is the temperature measured by said thermocouple at the end of the predetermined time aNd B is a standard reference atmospheric pressure.

20. The apparatus set forth in claim 17 wherein said calculating means further includes means for storing a plurality of values representative of corrected fluid pressure in the article and means for performing a regression analysis on the plurality of values to linearize the values as a function of time to establish another value indicative of a rate of change of fluid pressure in the article.

21. The apparatus set forth in claim 20 wherein said means for performing a regression analysis calculates said rate of change of fluid pressure as a function of time according to the equation:

$$\ln P = \ln P_o + bt$$

where P is a corrected pressure value, $P_o$ is an intercept of the axis along which the natural log of corrected pressure values are plotted, b is said rate of change of the fluid pressure and t is the test time.

22. The apparatus set forth in claim 20 wherein said calculated means further includes means for compensating the plurality of values stored by said storing means as a function of a change in volume in an unaged article.

23. The apparatus set forth in claim 19 further including means for maintaining the temperature adjacent the article between predetermined a minimum temperature and a predetermined maximum temperature.

24. The apparatus set forth in claim 23 further including means for circulating air around the article.

25. A method of determining fluid pressure in a pressurized article, said method comprising the steps of:
   sensing the fluid pressure in the article and generating an electrical signal in proportion to the pressure sensed in the article;
   sensing the temperature adjacent the article and generating an electrical signal in proportion to the temperature sensed adjacent the article;
   acquiring the electrical signals generated in each of said sensing steps;
   computing a value representative of a fluid pressure in the article as a function of the electrical signals acquired;
   storing a plurality of the values computed in said computing step; and
   calculating the rate of change in corrected pressure in the article as a function of the plurality of values.

26. The method set forth in claim 25 further including the step of performing a computation on the plurality of values to compensate for growth in an unaged article.

27. The method set forth in claim 25 wherein said computing step includes calculating the value representative of the fluid pressure (P) in the article after a predetermined period of time according to the formula:

$$P = (P_1)(T/T_1) - B$$

where $P_1$ is the absolute pressure measured by said fluid pressure sensing step, T is the temperature measured by said temperature sensing step at the beginning of the predetermined time, $T_1$ is the temperature measured by said temperature sensing step at the end of the predetermined time and B is a standard reference atmospheric pressure.

* * * * *

UNITED STATES PATENT AND TRADEMARK OFFICE
CERTIFICATE OF CORRECTION

PATENT NO. : 4,938,056

DATED : July 3, 1990

INVENTOR(S) : James L. DeRudder, Kenneth M. Schur, John P. Porter

It is certified that error appears in the above-identified patent and that said Letters Patent is hereby corrected as shown below:

Column 10, Claim 19, Line 53 "aNd" should read -- and --

Column 11, Claim 22, Line 8 "calculated" should read
 -- calculating --

Column 11, Claim 23, Line 11 "19" should read -- 17 --

Signed and Sealed this

Twenty-first Day of April, 1992

Attest:

HARRY F. MANBECK, JR.

*Attesting Officer*  *Commissioner of Patents and Trademarks*